US012648070B2

(12) United States Patent
Lin

(10) Patent No.: US 12,648,070 B2
(45) Date of Patent: Jun. 2, 2026

(54) LIGHTING APPARATUS

(71) Applicant: LEEDARSON LIGHTING CO., LTD., Zhangzhou (CN)

(72) Inventor: Yusheng Lin, Zhangzhou (CN)

(73) Assignee: LEEDARSON LIGHTING CO., LTD., Zhangzhou (CN)

( * ) Notice: Subject to any disclaimer, the term of this patent is extended or adjusted under 35 U.S.C. 154(b) by 291 days.

(21) Appl. No.: 18/218,005

(22) Filed: Jul. 3, 2023

(65) Prior Publication Data

US 2025/0016900 A1    Jan. 9, 2025

(51) Int. Cl.
| | |
|---|---|
| *H04B 10/00* | (2013.01) |
| *H01Q 5/371* | (2015.01) |
| *H04B 7/06* | (2006.01) |
| *H05B 47/125* | (2020.01) |
| *H05B 47/19* | (2020.01) |

(52) U.S. Cl.
CPC ............. *H05B 47/19* (2020.01); *H01Q 5/371* (2015.01); *H04B 7/0613* (2013.01); *H05B 47/125* (2020.01)

(58) Field of Classification Search
CPC . H04B 10/116; H04B 10/1123; H04B 10/112; H04B 10/114; H04B 10/1143; H04B 10/1149; H04B 10/2575; H04B 10/25753; H04B 10/40; H05B 33/0842; H05B 33/0896; H05B 33/0848; H05B 37/0272; H05B 37/0245; H05B 47/19
USPC ........ 398/172, 115, 116, 117, 118, 119, 127, 398/128, 129, 130, 131, 135, 136, 158, 398/159, 33, 38, 25, 26, 27; 315/149, 315/152, 307, 312, 291, 292, 294, 297, 315/158
See application file for complete search history.

(56) References Cited

U.S. PATENT DOCUMENTS

| | | | | | |
|---|---|---|---|---|---|
| 8,445,826 | B2 * | 5/2013 | Verfuerth | ............. | H05B 47/196 340/910 |
| 11,632,846 | B2 * | 4/2023 | Alexander | ............. | H05B 45/30 315/291 |
| 11,716,142 | B2 * | 8/2023 | Owen-Pines | ........ | H04B 10/116 398/115 |
| 2010/0021163 | A1 * | 1/2010 | Shieh | ................. | H04B 10/6162 398/65 |
| 2025/0030482 | A1 * | 1/2025 | Lin | ..................... | H04L 27/2628 |

* cited by examiner

*Primary Examiner* — Hanh Phan
(74) *Attorney, Agent, or Firm* — LANWAY IPR SERVICES; Chun-Ming Shih

(57) ABSTRACT

A lighting apparatus includes a light source, a power module, a controller, a data input module and a signal processing unit. The light source includes multiple types of LED modules. The power module converts an AC power to a DC power. The controller generating multiple driving currents supplied to the LED modules. The data input module is coupled to the controller. The data input module receives input data to be transmitted. The signal processing unit is coupled to the data input module to process the input data into multiple data streams corresponding to the plurality of transmit antennas. Each transmit antenna transmits the corresponding data stream independently.

19 Claims, 8 Drawing Sheets

LIGHTING APPARATUS

FIELD

The present invention is related to a lighting apparatus, and more particularly related to a lighting apparatus with flexible network connection.

BACKGROUND

LED (Light-Emitting Diode) light devices have gained significant popularity and widespread usage in today's life due to several compelling advantages. Firstly, LED lights are highly energy-efficient. They consume significantly less energy compared to traditional incandescent or fluorescent lights, resulting in reduced electricity bills and lower environmental impact. The energy efficiency of LEDs is due to their ability to convert a higher percentage of electrical energy into visible light, while minimizing heat generation.

Secondly, LED light devices have an exceptionally long lifespan. They can last up to 25 times longer than traditional bulbs, reducing the frequency of replacements and associated maintenance costs. This longevity is attributed to the absence of filaments or gases that can degrade over time. As a result, LED lights are particularly favored for applications where long-lasting illumination is crucial, such as street lighting, automotive lighting, and commercial signage.

Thirdly, LEDs offer superior durability and robustness. They are resistant to shocks, vibrations, and extreme temperature variations, making them suitable for both indoor and outdoor applications. LED lights are also compact in size, allowing for versatile installation options and integration into various products, ranging from smartphones and televisions to automotive headlights and decorative lighting fixtures.

Furthermore, LED light devices provide enhanced lighting control and flexibility. They can be dimmed easily, allowing users to adjust the brightness to their desired level, creating the right ambiance for different settings. Additionally, LEDs offer instant illumination with no warm-up time, unlike traditional bulbs that require time to reach full brightness. This instant-on feature is advantageous in applications where immediate lighting is required, such as traffic signals and emergency lighting.

Moreover, LED lights are environmentally friendly. Unlike fluorescent lights, they do not contain toxic substances like mercury, which can be harmful to human health and the environment. LED technology is considered more sustainable due to its energy efficiency, longevity, and recyclability. As a result, LED light devices contribute to reducing carbon emissions and minimizing the ecological footprint associated with lighting.

Lastly, LED light devices provide a wide range of color options and excellent color rendering capabilities. LEDs can produce a broad spectrum of colors, including vibrant and saturated hues, allowing for creative and customized lighting designs. Additionally, LEDs offer high color rendering index (CRI), ensuring that objects appear more natural and accurate under their illumination. This makes LED lights suitable for applications where color quality and aesthetics are important, such as retail displays, art galleries, and photography studios.

In summary, LED light devices are widely used in today's life due to their energy efficiency, long lifespan, durability, lighting control, environmental friendliness, and versatile color options. As technology continues to advance, LEDs are expected to further revolutionize the lighting industry, leading to increased adoption and innovative applications across various sectors.

Connectivity plays a crucial role in today's electronic world, where devices can communicate efficiently and generate multiplied effects compared to standalone devices. The ability of devices to connect and share information opens up a wide range of possibilities and benefits.

Firstly, connectivity enables seamless communication and data exchange between devices. When devices can communicate with each other, they can work together synergistically, leading to enhanced functionality and productivity. For example, in a smart home ecosystem, connected devices such as thermostats, lights, and security systems can collaborate to create an automated and personalized living environment, optimizing energy usage and providing convenience to the occupants.

Secondly, connectivity facilitates the concept of the Internet of Things (IoT), where everyday objects are interconnected and can share data. This connectivity empowers devices to gather and analyze information, enabling data-driven insights and decision-making. IoT devices can provide valuable real-time data for various applications, ranging from smart cities and industrial automation to healthcare monitoring and agriculture. The ability to collect and exchange data among devices improves efficiency, enables predictive maintenance, and enhances overall system performance.

Furthermore, connectivity brings more flexibility and convenience to our lives. With interconnected devices, individuals can access and control various functions remotely, providing convenience and comfort. For example, through a smartphone app, one can adjust the temperature of their home, monitor security cameras, or even remotely start their car. Connectivity also enables seamless integration across platforms and services, allowing users to access and manage their data and devices across different applications and ecosystems.

Lastly, connectivity fosters collaboration and innovation. When devices can communicate efficiently, they can form networks or ecosystems, encouraging collaboration between different manufacturers and developers. This collaborative approach leads to the creation of new services, applications, and business models. For instance, the integration of smart devices, cloud computing, and artificial intelligence has given rise to innovative services like virtual assistants, smart transportation systems, and personalized healthcare solutions.

In summary, connectivity in today's electronic world brings about multiplied effects when devices can communicate efficiently. It enables seamless communication, data exchange, and collaboration between devices, leading to enhanced functionality, productivity, and innovation. Furthermore, connectivity offers flexibility, convenience, and the potential for creating interconnected ecosystems that can transform various aspects of our lives, from homes and cities to industries and healthcare.

There are various types of lighting apparatuses. When cost and light efficiency of LED have shown great effect compared with traditional lighting devices, people look for even better light output. It is important to recognize factors that can bring more satisfaction and light quality and flexibility.

Light devices are widely used and most time, they are disposed on ceiling or wall or other stationary platforms. It is not easy to install such devices, because users may also need to install control units like wall switches.

It is beneficial if such light devices may have more functions to enhance living of people who use the light devices.

SUMMARY

In some embodiments, a lighting apparatus includes a light source, a power module, a controller, a data input module and a signal processing unit.

The light source includes multiple types of LED modules.

The power module converts an AC power to a DC power.

The controller generating multiple driving currents supplied to the LED modules.

The data input module is coupled to the controller.

The data input module receives input data to be transmitted.

The signal processing unit is coupled to the data input module to process the input data into multiple data streams corresponding to the plurality of transmit antennas.

Each transmit antenna transmits the corresponding data stream independently.

In some embodiments, the input data are generated by the controller according to transmitted data of an electronic device connected to the controller.

In some embodiments, the electronic device is coupled to the controller via a second network with a different protocol from a first network used by the plurality of antennas.

In some embodiments, there are multiple electronic devices wirelessly connected to the signal processing unit to share the plurality of antennas to transmit data of the multiple electronic devices.

In some embodiments, the electronic device is coupled with a same housing used for disposing the light source.

The control device adjusts the light source for the electronic device to operate normally.

In some embodiments, the electronic device is a camera device.

Recorded video of the camera device is encoded by the signal processing unit and sent to an external device over the Internet via the plurality of antennas.

In some embodiments, the electronic device communicates with an external device over Internet via the plurality of multiple antennas.

In some embodiments, the signal processing unit and the plurality of antennas shared with the electronic device.

The electronic device disables another signal processing unit of the external device for routing output data of the electronic device to the signal processing unit of the lighting apparatus via the second network.

In some embodiments, the electronic device also has a light source for providing illumination together with the lighting apparatus.

In some embodiments, the second network is an optical modulation network.

Data transmission between the lighting apparatus and the electronic device is modulated over an emitted light of the electronic device.

In some embodiments, the electronic device is a sensor for collecting ambient information aside the lighting apparatus.

The lighting apparatus is fixed to a stationary platform.

In some embodiments, the electronic device sends a connection parameter to the controller via the second network for the controller establishes the first network for operating the plurality of antennas.

In some embodiments, the lighting apparatus may also include a precoding module.

The precoding module applies precoding to the multiple data streams to enhance signal transmission performance.

In some embodiments, the lighting apparatus may also include a channel estimation unit.

The channel estimation unit estimates channel characteristics for each transmit antenna based on a receiver feedback information received from a receiver.

In some embodiments, the lighting apparatus may also include a control module.

The control module adjusts the precoding based on the estimated channel characteristics.

In some embodiments, at least a portion of the multiple transmit antennas are disposed on different planes.

In some embodiments, at least of the plurality of the transmit antennas is a three-dimension antenna.

The three-dimension antenna includes a metal node, a first branch and a second branch.

The first branch and the second branch are connected to the metal node.

The metal node includes a feeding port for receiving signal to be emitted.

At least a portion of the first branch and at least a portion of the second branch are arranged on different planes.

In some embodiments, three dimension antenna is a multi-band antenna for transmitting signals in multiple frequency ranges.

In some embodiments, the first branch includes a first plurality of segments.

Each segment of the first plurality of segments is smaller than $1/10$ of a lowest operating free-space wavelength of the multi-band antenna.

In some embodiments, the first plurality of segments includes at least ten segments.

DETAILED DESCRIPTION

Figure 1:
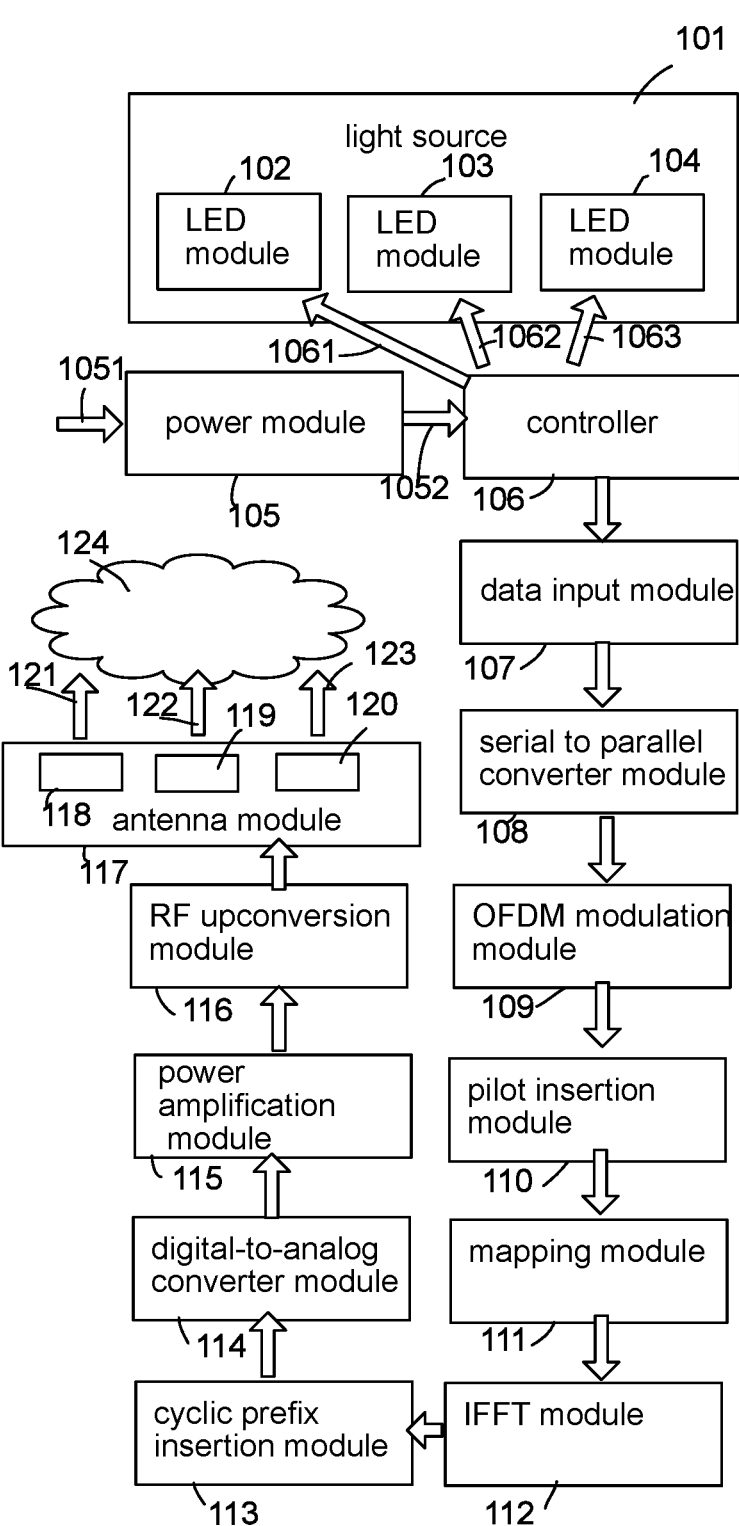
FIG. 1 illustrates a lighting apparatus embodiment.

In FIG. 1, a lighting apparatus includes a light source 101, a power module 105, a controller 106, a data input module 107, a serial-to-parallel converter module 108, an orthogonal frequency division multiplexing (OFDM) modulation module 109, a radio frequency (RF) upconversion module 116 and an antenna module 117.

The light source 101 includes multiple types of LED modules 102, 103, 104. These LED modules 102, 103, 104 may include same LED chips but covered with different fluorescent layers for generating lights of different light parameters like color temperatures, colors. By controlling driving currents and/or timing for supplying power may adjust a mixed light parameter meeting users need. Users may use a manual switch, a remote control or other devices coupled to the controller 106 to adjust the required light parameter.

The power module 105 converts an AC power 1051 to a DC power 1052.

The controller 106 generates multiple driving currents 1061, 1062, 1063 supplied to the LED modules 102, 103, 104.

There are various ways to control the driving currents, e.g. PWM. PWM (Pulse Width Modulation) may be used to control the driving currents supplied to different LED modules, allowing us to mix and achieve desired light parameters like color temperature. It works by precisely adjusting the width and frequency of electrical pulses sent to the LED modules. By varying the pulse width, we can control the intensity of the current flowing through the LEDs.

With PWM, we can mix LED modules that emit different colors or have different color temperatures. By independently adjusting the driving currents for each module, we can create seamless transitions between warm and cool tones of light. This level of control gives us the ability to set the perfect lighting ambiance for any space or occasion.

One of the advantages of PWM is its flexibility. By controlling the driving currents of each LED module, we can create dynamic lighting effects. This is particularly useful for architectural lighting, stage productions, or visual displays where captivating and immersive lighting arrangements are desired.

PWM technology also brings efficiency benefits. By precisely adjusting the driving currents, we can optimize power consumption without compromising on lighting quality. This leads to energy savings and extends the lifespan of the LED modules, reducing the need for frequent replacements and maintenance.

In summary, PWM is a powerful technology that enables us to control the driving currents supplied to LED modules for mixing desired light parameters. It provides precise control over intensity and color temperature, allowing for customizable lighting experiences. With PWM, we can achieve dynamic lighting effects, save energy, and create captivating visual environments.

The data input module 107 is coupled to the controller 106. The data input module 107 receives input data to be transmitted.

The data input module 107 is a crucial component in an OFDM (Orthogonal Frequency Division Multiplexing) system, responsible for receiving and handling the input data to be transmitted. Its role is to process and prepare the data for modulation and subsequent transmission over the wireless channel.

In the OFDM system, the data input module 107 typically interfaces with external devices or systems that generate or provide the data to be transmitted. This can include sources such as audio/video devices, data storage systems, or network connections. The module receives the input data in a suitable format, which could be digital data streams, audio/video signals, or other types of information.

Upon receiving the input data, the module may perform various tasks to prepare it for modulation. These tasks can include data formatting, error correction encoding, or data compression, depending on the specific requirements and characteristics of the data transmission system. The data input module ensures that the input data is in a suitable format and ready for further processing.

Additionally, the data input module may incorporate protocols or algorithms to handle synchronization and timing aspects of the input data. In an OFDM system, precise timing and synchronization are critical to ensure proper demodulation and reception of the transmitted data. The module may synchronize the input data streams with the system clock or apply synchronization techniques to align the data with the OFDM symbols and subcarriers.

Overall, the data input module in an OFDM system serves as the interface between the external data sources and the internal processing components. It handles tasks such as data formatting, error correction encoding, compression, and synchronization, ensuring that the input data is properly prepared for modulation and subsequent transmission. The efficiency and accuracy of the data input module contribute to the overall performance and reliability of the OFDM communication system.

The serial-to-parallel converter module 108 converts the input data into multiple parallel data streams.

The serial-to-parallel converter module is a crucial component in an OFDM (Orthogonal Frequency Division Multiplexing) system that plays a vital role in preparing the input data for modulation and transmission. As the name suggests, this module converts the incoming serial data stream into multiple parallel data streams, which are then used for further processing and modulation.

In an OFDM system, the input data is typically received in a sequential or serial format. However, for efficient transmission using the parallel processing capabilities of OFDM, the data needs to be organized into multiple parallel streams that can be modulated onto different subcarriers simultaneously.

The serial-to-parallel converter module takes the incoming serial data stream and divides it into several parallel data streams. This conversion is achieved by assigning different portions or subsets of the input data to each parallel stream. The number of parallel streams is determined by the total number of subcarriers used in the OFDM system.

By converting the serial data stream into parallel data streams, the module enables simultaneous transmission of multiple data symbols or bits. This parallelization helps to increase the data transmission rate and overall system capacity.

Additionally, the serial-to-parallel converter module ensures synchronization and alignment of the parallel data streams with the OFDM symbol structure. Each parallel stream corresponds to a specific subcarrier and is associated with a specific frequency in the frequency domain. The module ensures that the data is properly organized and aligned with the OFDM symbol boundaries, ensuring accurate demodulation at the receiver end.

Overall, the serial-to-parallel converter module in an OFDM system is responsible for dividing the incoming serial data stream into multiple parallel data streams. This conversion allows for simultaneous transmission on different subcarriers, increasing the data transmission rate and system capacity. Additionally, the module ensures synchronization and alignment of the parallel data streams with the OFDM symbol structure, enabling accurate demodulation and reception of the transmitted data.

The orthogonal frequency division multiplexing (OFDM) modulation module 109 modulates the parallel data streams onto multiple orthogonal subcarriers.

The orthogonal frequency division multiplexing (OFDM) modulation module is a fundamental component in an OFDM system that performs crucial tasks related to the modulation of parallel data streams onto subcarriers for transmission. Its role is to convert the parallel data streams into the frequency domain representation required for efficient transmission over the wireless channel.

Firstly, the OFDM modulation module takes the parallel data streams received from the serial-to-parallel converter module and applies a process called inverse fast Fourier transform (IFFT). The IFFT converts the data from the time-domain to the frequency-domain representation. This transformation is essential for dividing the available frequency spectrum into orthogonal subcarriers, which carry the parallel data streams.

Once the data is in the frequency domain, the OFDM modulation module performs a crucial step known as subcarrier modulation. Each subcarrier is modulated independently with the corresponding parallel data stream using techniques such as phase-shift keying (PSK), quadrature amplitude modulation (QAM), or other modulation schemes. This modulation process encodes the data onto the subcarriers, readying it for transmission.

The OFDM modulation module also incorporates techniques to mitigate interference between subcarriers. It ensures that the subcarriers are carefully spaced to achieve orthogonality, meaning they do not overlap or interfere with each other. Orthogonality is crucial to prevent inter-symbol interference and ensure that the data streams can be accurately demodulated at the receiver end.

Furthermore, the module may incorporate additional processing to accommodate system requirements and channel conditions. This can include pilot signal insertion, which involves inserting known reference symbols at specific subcarrier positions. The pilot signals aid in channel estimation, equalization, and synchronization at the receiver, enhancing the overall system performance.

Additionally, the OFDM modulation module handles the mapping of the modulated subcarriers onto specific time-frequency resource blocks. These resource blocks define the allocation of subcarriers and symbol durations, allowing for efficient utilization of the available frequency spectrum.

In summary, the OFDM modulation module in an OFDM system is responsible for converting parallel data streams into the frequency domain, modulating the data onto orthogonal subcarriers, mitigating interference, and mapping the modulated subcarriers onto time-frequency resource blocks. It plays a vital role in preparing the data for transmission, ensuring efficient utilization of the available frequency spectrum and enabling accurate demodulation at the receiver end.

Orthogonality plays a critical role in orthogonal frequency division multiplexing (OFDM) systems, offering significant advantages in signal modulation and preventing interference between signals when transmitted through the air.

In an OFDM system, the subcarriers used for modulation are carefully spaced to be orthogonal to each other. This means that the subcarriers have no overlap and do not interfere with one another. The orthogonality property enables the simultaneous transmission of multiple subcarriers, each carrying independent data streams. This allows for efficient utilization of the frequency spectrum and significantly increases the data transmission capacity of the system.

Orthogonality is crucial in signal modulation because it simplifies the demodulation process at the receiver. When the subcarriers are orthogonal, they can be easily separated at the receiver end using a process called the fast Fourier transform (FFT). The orthogonality ensures that each subcarrier can be demodulated independently, without interference from other subcarriers. This simplifies the signal demodulation process and enables accurate recovery of the original data streams.

Furthermore, orthogonality helps mitigate the effects of multipath interference in wireless channels. In wireless communication, signals can undergo reflections, scattering, and other propagation phenomena that cause the signals to take multiple paths and arrive at the receiver with varying delays. The orthogonality of subcarriers in OFDM helps in dealing with multipath interference by separating the delayed signals in the frequency domain. This allows the receiver to individually equalize and combine the received subcarriers, effectively mitigating the negative effects of multipath fading and improving overall system performance.

The orthogonality property also contributes to the resilience of OFDM systems against narrowband interference. Narrowband signals that fall outside the allocated subcarrier frequencies do not disrupt the transmission of other subcarriers due to their orthogonality. Interference from neighboring frequency bands or adjacent channels can be effectively rejected by the receiver, ensuring robust and reliable data transmission.

Moreover, the orthogonality of subcarriers allows for better spectral containment. Since the subcarriers do not overlap, the sidebands of each subcarrier are confined to their allocated frequency range. This reduces spectral leakage and improves spectral efficiency, enabling more efficient utilization of the available frequency spectrum.

Overall, orthogonality is a fundamental characteristic of OFDM systems that ensures efficient signal modulation, robustness against interference, and improved spectral containment. It enables simultaneous transmission of multiple independent data streams while simplifying the demodulation process at the receiver end. Orthogonality plays a crucial role in the success and widespread adoption of OFDM in various wireless communication standards, such as Wi-Fi and cellular networks.

To provide an easy-to-understand example of orthogonal signals, let's consider two people standing on opposite sides of a large field. Each person has a flag that they can wave to communicate with each other.

Now, imagine that the two people agree to use orthogonal waving patterns. Person A decides to wave their flag up and down, while Person B chooses to wave their flag left and right. These waving patterns are orthogonal because they are perpendicular to each other.

When Person A starts waving their flag up and down, Person B can easily distinguish and recognize this waving pattern as separate from their own left-to-right waving. Similarly, when Person B waves their flag left and right, Person A can clearly distinguish this motion from their own up-and-down waving. Despite both people waving their flags simultaneously, there is no confusion or interference between their signals because they have chosen orthogonal waving patterns.

In this example, the waving patterns represent the orthogonal signals in an OFDM system. Each person's waving pattern corresponds to a subcarrier in OFDM, and the field represents the frequency spectrum available for transmission. The orthogonal waving patterns allow for simultaneous communication without interfering with each other.

This example demonstrates the importance of orthogonality in signal communication. It ensures that different signals can coexist and be easily distinguished, even when transmitted simultaneously. By applying this concept to the frequencies used in OFDM, where subcarriers are carefully chosen to be orthogonal, we can achieve efficient and reliable communication with minimal interference between the signals.

Each subcarrier is associated with a specific frequency and carries a portion of the parallel data streams.

In orthogonal frequency division multiplexing (OFDM) systems, the transmission bandwidth is divided into multiple subcarriers, each associated with a specific frequency. This frequency allocation ensures that different subcarriers can carry independent data streams simultaneously, enabling efficient and simultaneous data transmission.

By assigning each subcarrier to a specific frequency, OFDM systems achieve a highly efficient use of the available spectrum. The subcarriers are carefully chosen to be orthogonal to each other, meaning they have no overlap and do not interfere with one another. This allows for simultaneous transmission of multiple data streams, significantly increasing the system's capacity and throughput.

Each subcarrier in an OFDM system carries a portion of the parallel data streams. This means that the total data to be transmitted is divided into smaller segments, and each segment is assigned to a different subcarrier. By dividing the data in this way, each subcarrier carries a specific subset of the overall data, allowing for parallel transmission and efficient utilization of the available bandwidth.

The allocation of data to different subcarriers is typically done using modulation techniques such as phase-shift keying (PSK) or quadrature amplitude modulation (QAM). These modulation schemes encode the data onto the subcarriers, enabling the receiver to demodulate and recover the original data streams accurately.

The specific frequency associated with each subcarrier is determined by the system's design and the available bandwidth. The number of subcarriers and their frequency spacing is carefully chosen to achieve orthogonality, ensuring that the subcarriers do not interfere with one another. This orthogonality property enables the receiver to separate and recover the individual data streams with minimal interference.

The use of specific frequencies for each subcarrier allows for selective filtering and equalization at the receiver end. By employing frequency-selective equalization techniques, the receiver can compensate for channel impairments or frequency-selective fading that may affect different subcarriers differently.

In summary, in an OFDM system, each subcarrier is associated with a specific frequency and carries a portion of the parallel data streams. This frequency allocation enables simultaneous transmission of multiple data streams, leading to efficient utilization of the available spectrum. The orthogonality of the subcarriers ensures minimal interference between them, enabling accurate demodulation and reliable data recovery at the receiver.

The radio frequency (RF) upconversion module 116 upconverts the multiple data streams to multiple desired transmission frequencies.

In an OFDM (Orthogonal Frequency Division Multiplexing) system, the radio frequency (RF) upconversion module plays a crucial role in the transmission process. Its purpose is to convert the multiple data streams, which have been modulated onto different subcarriers, to the desired transmission frequencies for wireless communication.

After the parallel data streams have undergone modulation onto subcarriers in the frequency domain, the RF upconversion module steps in to raise the frequency of these signals. Each data stream corresponds to a specific subcarrier with its own frequency. The RF upconversion module takes these modulated subcarriers and increases their frequency to the desired transmission frequencies.

By upconverting the frequency of the modulated data streams, the RF upconversion module ensures that the signals are in the appropriate frequency range for wireless transmission. This step is essential because wireless communication typically operates in specific frequency bands allocated for various applications such as Wi-Fi, cellular networks, or radio broadcasting.

The RF upconversion module achieves the frequency upconversion by utilizing techniques such as mixing or frequency multiplication. These methods involve manipulating the input signals to shift their frequency to the desired transmission frequencies while preserving the information encoded in them. This process ensures that the modulated data streams are ready for wireless transmission and can be effectively radiated through an antenna.

The upconverted signals are then passed through a power amplification stage to boost their power level to an appropriate level for transmission. This amplification is necessary to ensure that the signals can propagate over the desired range and achieve reliable communication.

The RF upconversion module's ability to convert the multiple data streams to the desired transmission frequencies is crucial for achieving successful wireless communication in an OFDM system. It ensures that the modulated signals are properly prepared and tuned for transmission in the wireless medium, allowing them to propagate through the air and be received by the intended receivers.

The RF upconversion module in an OFDM system is responsible for converting the multiple data streams, which have been modulated onto different subcarriers, to the desired transmission frequencies. This process is essential for enabling wireless communication by raising the frequency of the signals and preparing them for transmission through the air. The RF upconversion module, in combination with power amplification, ensures that the modulated data streams are ready to be radiated through an antenna and transmitted wirelessly to the intended recipients.

The antenna module includes multiple antennas configured to transmit RF signals corresponding to the multiple data streams.

In an OFDM (Orthogonal Frequency Division Multiplexing) system, the antenna module is a crucial component responsible for transmitting RF (Radio Frequency) signals corresponding to the multiple data streams. Its role is to convert the modulated data streams into electromagnetic waves and radiate them into the wireless medium.

The antenna module consists of multiple antennas that are configured to handle the transmission of the RF signals. Each antenna corresponds to a specific data stream that has been modulated onto a subcarrier. The multiple antennas work in tandem to transmit the individual RF signals associated with the parallel data streams simultaneously.

The antennas in the module are designed to efficiently radiate the RF signals into the surrounding space. They convert the electrical signals received from the RF upconversion stage into electromagnetic waves that propagate through the air. The antennas are carefully positioned and optimized to achieve desired radiation patterns, coverage, and gain for effective communication.

By utilizing multiple antennas, the OFDM system takes advantage of spatial diversity and spatial multiplexing techniques. Spatial diversity helps improve the reliability of the wireless communication by mitigating the effects of fading and interference. If one antenna experiences signal degradation, the other antennas can still transmit the RF signals, ensuring a more robust and reliable transmission.

Spatial multiplexing, on the other hand, enables the simultaneous transmission of multiple data streams using different antennas. Each antenna transmits a unique data stream, allowing for increased data rates and enhanced system performance. The receiver, equipped with a corresponding antenna configuration, can then demultiplex and extract the individual data streams from the received signals.

The antenna module's ability to transmit the RF signals corresponding to the multiple data streams is essential for the successful communication of an OFDM system. It ensures that the modulated data is effectively radiated into the wireless medium, enabling its propagation and reception by the intended receivers. The configuration and characteristics of the antennas greatly influence the system's coverage, capacity, and overall performance.

The antenna module in an OFDM system includes multiple antennas that are configured to transmit RF signals corresponding to the multiple data streams. These antennas work together to radiate the modulated data streams into the wireless medium. By leveraging spatial diversity and spatial multiplexing, the antenna module enhances the reliability, data rates, and overall performance of the OFDM system. It plays a vital role in ensuring effective wireless transmission and reception of the modulated data streams.

Figure 2:
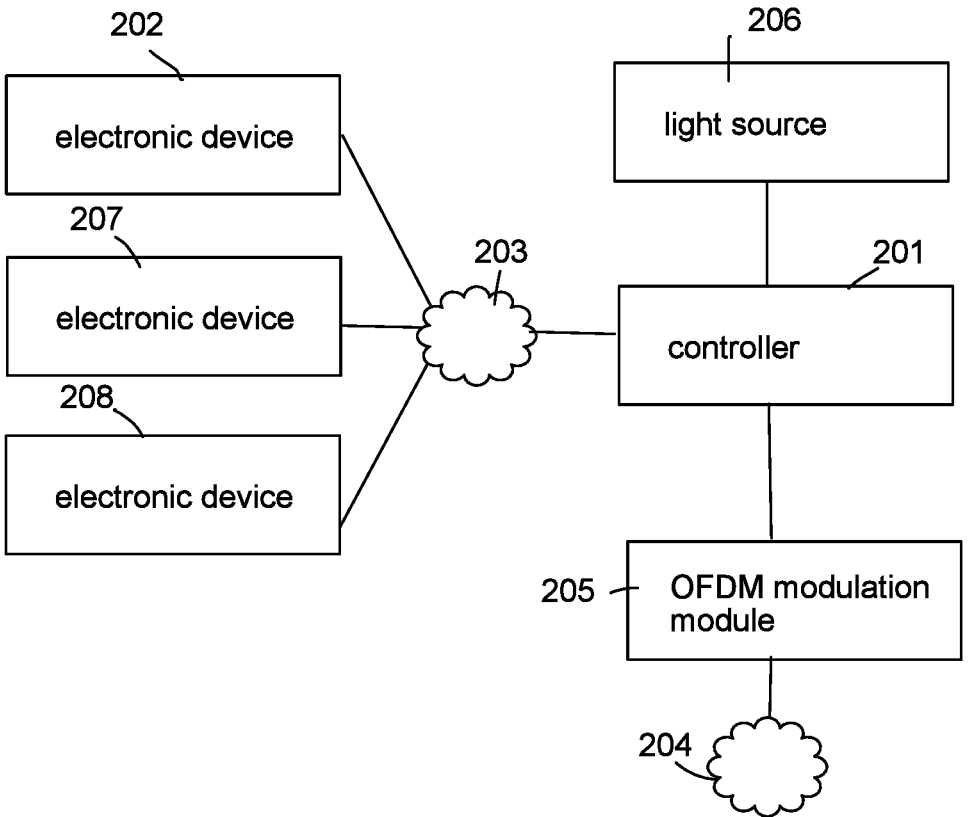
FIG. 2 illustrates a circuit diagram of the lighting apparatus embodiment.

In FIG. 2, the input data are generated by the controller 201 according to transmitted data of an electronic device 202 connected to the controller 201.

In some embodiments, the electronic device 202 is coupled to the controller 201 via a second network 203 with a different protocol from a first network 204 of the OFDM modulation module 205.

For example, the first network 204 to which the OFDM modulation module 205 modulates data to signal is a 4G network that further connected to the Internet. The second network 203 may be a local short distance network like Bluetooth. The electronic device 202 may be another lighting apparatus that is disposed aside the lighting apparatus mentioned above. The electronic device 202, in some other embodiments, may be a sensor, a camera, a speaker, or any other devices that coupled to the controller 201 wirelessly or via a wire.

In some embodiments, there are multiple electronic devices 202, 207, 208 wirelessly connected to the OFDM modulation module 205 to share the OFDM modulation module 205 to transmit data of the multiple electronic devices 202, 207, 208.

In other words, the electronic devices 202, 207, 208 may connect to the Internet via 4G network like the first network 204 illustrated in FIG. 2, even they only connect to the lighting apparatus.

This is very useful particularly when the lighting apparatus is fixed to a stationary platform, like a ceiling or a wall surface. By deploying the lighting apparatus in such way, the lighting apparatus is located statically in a place, with electric supply and may be a central station for connecting more devices to enhance overall interaction.

For example, with such arrangement, not every electronic device 202 needs to have a OFDM modulation module but the electronic device 202 may still transmit data via an OFDM network.

Since the controller 201 is also coupled to the light source 206 for controlling light parameters by generating corresponding driving currents, such design simplifies overall circuit cost and makes the connection more flexible.

Figure 3:
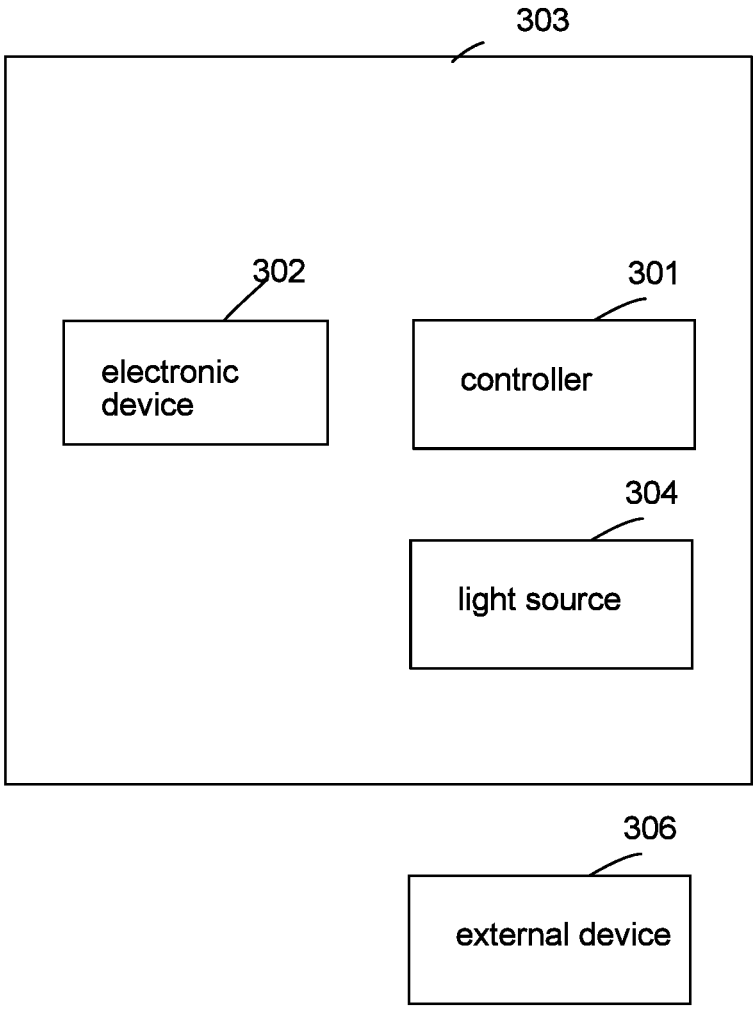
FIG. 3 shows another lighting apparatus embodiment.

In FIG. 3, the electronic device 302 is coupled with a same housing 303 used for disposing the light source 304.

The control device 301 adjusts the light source 304 for the electronic device 302 to operate normally. For example, the electronic device 302 is a speaker or a camera device integrated with the lighting apparatus.

In elder care facility, cameras may be easily installed because they are integrated with lighting apparatus that already has an installation box to insert the lighting apparatus. The cameras may be customized to detect accident while not affecting personal privacy.

In such case, the light source provides sufficient light for the camera to function normally. The controller 301 is helpful because the light source 304 may be adjusted when the camera is determined to turn on while some events are detected, e.g. falling sounds.

In such case, even the light source 304 is originally turned off, to activate the camera and make the camera working normally, the light source 304 is turned on temporarily for capturing clear pictures to protect the elder under the lighting apparatus and the camera.

In some embodiments, the electronic device is a camera device.

Recorded video of the camera device is encoded by the OFDM modulation module and sent to an external device 306 over the Internet via the antenna module mentioned above.

In some embodiments, the electronic device 302 communicates with an external device 306 over Internet via the OFDM modulation module mentioned above.

The electronic device 302 integrated with the lighting apparatus may have its own unique identification code while the lighting apparatus has another unique identification code so that the electronic device 302 and the lighting apparatus may be located and controlled separately. Messages may be selectively sent to the lighting apparatus and/or the electronic device 302.

In some embodiments, the OFDM modulation module is shared with the electronic device.

The electronic device disables another OFDM modulation module of the external device for routing output data of the electronic device to the OFDM modulation module via the second network.

For example, in the example of FIG. 2, the electronic device 202 may be another lighting apparatus with the same structure as the lighting apparatus mentioned above. In other words, the electronic device 202 also has an OFDM modulation module and other components to communicate in the first network 204 like an 4G network to connect to the Internet.

But, the electronic device 202 may be automatically configured when the electronic device 202 detects the lighting apparatus with the OFDM modulation module 205 nearby.

In such case, the electronic device 202 automatically disables its own OFDM function but uses only its network interface for the second network 203.

Even the electronic device 202 only uses the second network 203, by help of the controller 201, the data of the electronic device 202 may still able be transmitted to the Internet by sharing the OFDM modulation module 205.

In some embodiments, the electronic device also has a light source for providing illumination together with the lighting apparatus.

In some embodiments, the second network is an optical modulation network.

In other words, the electronic device 202 may encoded its data to transmit to the controller 201 via a light modulation technology like Li-Fi. In other words, the communication is a hybrid transmission using both OFDM and optical modulation network.

Data transmission between the lighting apparatus and the electronic device is modulated over an emitted light of the electronic device.

In some embodiments, the electronic device is a sensor for collecting ambient information aside the lighting apparatus. For example, the electronic device 202 may be a temperature detector, a smoke detector, human action detector, light detector, accident warning detector and/or other various sensors.

The lighting apparatus is fixed to a stationary platform, like a wall or a ceiling.

In some embodiments, the electronic device sends a connection parameter to the controller via the second network for the controller establishes the first network for operating the OFDM modulation module.

For example, the electronic device 202 wireless connected to the controller 201 uses a Bluetooth network, a RFID data transmission or other technology to transmit connection parameters like network ID and passwords to the controller 201 to initialize the network setting of the OFDM network that the OFDM modulation module 205 and other components may need to use the first network 204.

In FIG. 1, the lighting apparatus may also include a pilot insertion module 110 configured to insert pilot symbols into the modulated parallel data streams at predetermined positions for channel estimation and equalization.

The pilot insertion module in an OFDM (Orthogonal Frequency Division Multiplexing) system performs a crucial function by inserting pilot symbols into the modulated parallel data streams at predetermined positions. These pilot symbols serve two main purposes: channel estimation and equalization.

To begin with, channel estimation involves determining the characteristics of the wireless channel through which the OFDM signals propagate. By strategically inserting pilot symbols at specific positions in the modulated data streams, the pilot insertion module provides reference points for assessing the channel's response to the transmitted signals. The receiver can then leverage these received pilot symbols to estimate the channel's frequency response, phase shifts, and other relevant properties.

The second purpose of pilot symbol insertion is equalization. The pilot symbols act as known reference points that aid in compensating for distortions and impairments introduced by the wireless channel. By inserting pilot symbols into the modulated parallel data streams, the pilot insertion module enables the receiver to accurately determine the channel's frequency response. This information is subsequently utilized to perform equalization, where appropriate adjustments are applied to the received signals, mitigating the effects of channel fading, interference, and noise.

The pilot symbols are inserted at predetermined positions within the modulated data streams, following a carefully chosen pattern. These positions are selected to facilitate accurate estimation of the channel characteristics and enable effective equalization. The responsibility of determining these positions and inserting the pilot symbols lies with the pilot insertion module.

Ultimately, by inserting pilot symbols and enabling channel estimation and equalization, the pilot insertion module enhances the robustness and reliability of the OFDM system. The reference pilot symbols provide valuable insights into the wireless channel, allowing for accurate estimation and compensation of channel-induced distortions. This, in turn, empowers the receiver to demodulate data symbols with greater precision, resulting in improved overall system performance in terms of data detection and error correction.

Pilot signals in OFDM (Orthogonal Frequency Division Multiplexing) are reference signals inserted into the transmitted signal to assist in channel estimation, equalization, and signal recovery at the receiver. They serve as known reference points that provide valuable information about the wireless channel's characteristics and aid in mitigating the effects of channel impairments.

To understand the concept of pilot signals, let's consider an analogy of a treasure hunt. Imagine you are searching for hidden treasures in a vast and unfamiliar terrain. To navigate and make progress, you periodically encounter markers or guideposts strategically placed along the way. These markers provide valuable information about your location, direction, and any obstacles you may encounter ahead.

Similarly, in an OFDM system, pilot signals act as these markers or guideposts. They are carefully inserted into the transmitted signal at predetermined positions. These positions are known and defined in advance. When the signal reaches the receiver, it encounters these pilot signals, providing reference points for various purposes.

One such purpose is channel estimation. As the signal propagates through the wireless channel, it undergoes various distortions like multipath fading, interference, and noise. By observing the received pilot signals, the receiver can estimate the channel's response to the transmitted signal. This information allows the receiver to adjust its equalization algorithms and compensate for the channel-induced distortions, enhancing the accuracy of data recovery.

Pilot signals also aid in symbol synchronization. By detecting the timing and phase of the pilot symbols, the receiver can align itself with the transmitted signal's timing and correctly demodulate the subsequent data symbols. This synchronization ensures accurate symbol recovery and minimizes errors caused by timing discrepancies.

Additionally, pilot signals play a crucial role in equalization. By knowing the transmitted pilot symbols, the receiver can compare them with the received pilot symbols and identify any changes or distortions introduced by the channel. This knowledge enables the receiver to apply equalization techniques to counteract these effects, ensuring reliable and accurate demodulation of the data symbols.

In summary, pilot signals in OFDM act as reference markers or guideposts inserted into the transmitted signal. They assist in channel estimation, symbol synchronization, and equalization at the receiver. Just as markers help navigate a treasure hunt, pilot signals provide valuable information about the wireless channel's characteristics, aiding in accurate data recovery and mitigating the effects of channel impairments.

In some embodiments, the lighting apparatus may also include a mapping module 111 and an inverse fast Fourier transform (IFFT) module 112.

The mapping module 111 maps the modulated and pilot inserted parallel data streams onto time-frequency resource blocks.

The mapping module in an OFDM (Orthogonal Frequency Division Multiplexing) system serves a crucial function by mapping the modulated and pilot-inserted parallel data streams onto time-frequency resource blocks. This module plays a vital role in organizing the data streams for efficient transmission and accurate demodulation at the receiver.

To ensure effective transmission, the mapping module assigns the modulated and pilot-inserted data streams to specific time-frequency resource blocks. These resource blocks provide a structured grid-like framework that divides the available transmission time into discrete slots and the frequency spectrum into subcarriers. By allocating the data streams to their respective positions within the time-frequency grid, the mapping module optimizes the utilization of the available bandwidth.

By mapping the data streams onto time-frequency resource blocks, the system achieves efficient utilization of the available transmission resources. The flexibility of the mapping process allows for dynamic allocation of resource blocks to different data streams, based on factors such as priority, quality of service requirements, or system configuration. This dynamic allocation ensures optimized data transmission and enhances overall system performance.

Moreover, the mapping process enables accurate demodulation at the receiver end. By organizing the data streams into time-frequency resource blocks, the receiver knows precisely where to locate and expect the different data symbols during the demodulation process. This organized mapping facilitates proper demultiplexing and accurate recovery of the individual data streams from the received signal.

Additionally, the mapping module accounts for system-specific considerations such as guard intervals. Guard intervals are inserted between successive time slots to mitigate the effects of multipath interference. The mapping module ensures that the data streams are appropriately positioned within the resource blocks, accounting for guard intervals and maintaining the required timing relationships.

In conclusion, the mapping module in an OFDM system plays a crucial role in organizing and allocating the modulated and pilot-inserted parallel data streams onto time-frequency resource blocks. This process optimizes data transmission, facilitates accurate demodulation, and enables efficient utilization of the available transmission resources. The mapping module's contribution is essential for achieving reliable and high-performance communication in OFDM systems.

The IFFT module 112 performs an inverse fast Fourier transform on the mapped time-frequency resource blocks to generate time-domain OFDM signals.

The IFFT (Inverse Fast Fourier Transform) module 112 is a fundamental component in an OFDM (Orthogonal Frequency Division Multiplexing) system that plays a crucial role in the generation of time-domain OFDM signals. This module is responsible for converting the mapped time-frequency resource blocks, which contain the data streams, back into the time domain.

To generate time-domain OFDM signals, the IFFT module 112 performs an inverse fast Fourier transform on the mapped time-frequency resource blocks. This transformation is the reverse process of the initial Fourier transform performed during modulation, where the data streams were mapped onto the subcarriers in the frequency domain.

By applying the inverse fast Fourier transform, the IFFT module 112 combines the individual subcarriers, each carrying a portion of the modulated data streams, and reconstructs the time-domain OFDM signals. This conversion allows for the representation of the data in the time domain, which is suitable for transmission and reception.

The IFFT process essentially converts the frequency-domain representations of the data streams, which were distributed across the subcarriers, back into their original time-domain waveforms. This reconstruction enables the generation of a composite time-domain signal that encapsulates all the individual data streams.

The resulting time-domain OFDM signals from the IFFT module 112 are ready for transmission over the wireless channel. These signals represent the parallel data streams that were initially modulated and mapped onto the time-frequency resource blocks. They are now in a format that can be transmitted as electrical signals or electromagnetic waves, propagating through the air to reach the intended receiver.

In summary, the IFFT module 112 in an OFDM system performs an inverse fast Fourier transform on the mapped time-frequency resource blocks. This transformation converts the frequency-domain representations of the individual data streams back into their original time-domain waveforms, generating time-domain OFDM signals. These signals are then ready for transmission over the wireless channel, carrying the parallel data streams to be received and demodulated at the receiver end.

In some embodiments, the lighting apparatus may also include a cyclic prefix insertion module 113 and a digital-to-analog converter module 114.

The cyclic prefix insertion module 113 inserts a cyclic prefix to the time-domain OFDM signal to mitigate inter-symbol interference.

The cyclic prefix insertion module 113 plays a vital role in mitigating inter-symbol interference in an OFDM (Orthogonal Frequency Division Multiplexing) system. It accomplishes this by inserting a cyclic prefix to the time-domain OFDM signal before transmission.

Inter-symbol interference can occur when the transmitted signal encounters multipath propagation or other forms of channel distortion. It causes overlapping of symbols in the time domain, leading to errors in data reception. The cyclic prefix is a copy of the end portion of the OFDM symbol that is inserted at the beginning of each symbol.

By inserting a cyclic prefix, the cyclic prefix insertion module 113 creates a guard interval between symbols. This guard interval acts as a buffer, separating the symbols and preventing them from overlapping. It allows the receiver to isolate and properly demodulate each symbol without interference from the previous or subsequent symbols.

The length of the cyclic prefix is chosen to be longer than the expected delay spread of the channel, accounting for the maximum delay spread encountered in the wireless environment. This ensures that even if the transmitted signals experience different delays or reflections, the cyclic prefix is sufficiently long to accommodate any potential delay spread and prevent inter-symbol interference.

The cyclic prefix insertion module 113 adds the cyclic prefix to the time-domain OFDM signal immediately before transmission. This process does not modify the information carried by the data symbols themselves, as the cyclic prefix is a redundant copy of a portion of the symbol. Its sole purpose is to facilitate reliable demodulation and mitigate the effects of inter-symbol interference.

In summary, the cyclic prefix insertion module 113 in an OFDM system inserts a cyclic prefix to the time-domain OFDM signal. This insertion creates a guard interval between symbols, preventing inter-symbol interference caused by multipath propagation or channel distortions. The cyclic prefix acts as a buffer, allowing the receiver to accurately demodulate each symbol and ensuring reliable data reception.

The digital-to-analog converter module 114 converts the time-domain OFDM signals to analog signals.

The digital-to-analog converter (DAC) module 114 in an OFDM (Orthogonal Frequency Division Multiplexing) system is responsible for converting the time-domain OFDM signals, which are in digital format, into analog signals. This conversion is a crucial step in preparing the signals for transmission over analog communication channels.

The DAC module 114 takes the time-domain OFDM signals, which consist of discrete digital samples representing the amplitudes of the signal at different time instants, and transforms them into continuous analog waveforms. This conversion allows the signals to be accurately represented as varying voltage levels in the analog domain.

The DAC module 114 operates by employing digital-to-analog conversion techniques. It utilizes high-resolution digital-to-analog converters that can accurately reconstruct the analog signal from the discrete digital samples. The module takes the digital values of the samples and generates corresponding analog voltage levels that accurately represent the time-domain OFDM signals.

The digital-to-analog conversion performed by the DAC module 114 is crucial for ensuring compatibility with analog communication channels. Many traditional communication systems, such as radio or audio systems, rely on analog signals for transmission. By converting the time-domain OFDM signals to analog, the DAC module enables seamless integration with these analog communication channels.

The accuracy and fidelity of the digital-to-analog conversion are essential to preserve the integrity of the transmitted signals. The DAC module 114 must have a sufficiently high resolution to faithfully reproduce the time-domain OFDM signals as continuous analog waveforms. This ensures that the transmitted analog signals closely match the original digital representation and minimize any potential distortions or loss of information.

In summary, the digital-to-analog converter module 114 in an OFDM system converts the time-domain OFDM signals, represented in digital format, into continuous analog signals. This conversion allows for compatibility with analog communication channels and ensures accurate representation of the signals in the analog domain. The DAC module plays a critical role in preparing the signals for transmission, enabling seamless integration with traditional analog communication systems.

In some embodiments, the lighting apparatus may also include a power amplification module 115.

The power amplification module 115 amplifies the RF signals to a suitable power level for transmission.

The power amplification module 115 in an OFDM (Orthogonal Frequency Division Multiplexing) system serves a crucial role in preparing the RF (Radio Frequency) signals for transmission by amplifying them to a suitable power level. This module ensures that the signals are boosted to a level that allows for effective transmission and reception.

After the RF signals are generated, typically through a combination of modulation, pilot insertion, mapping, and other signal processing stages, they might have relatively low power levels. The power amplification module 115 addresses this by taking these signals and amplifying their power to a level appropriate for transmission.

The power amplification process involves utilizing power amplifiers that can efficiently boost the power of the RF signals without introducing significant distortion or degradation. These amplifiers are designed to handle the specific frequency range and power requirements of the OFDM system.

Amplifying the RF signals to an adequate power level is essential for achieving reliable and long-range communication. It ensures that the signals can overcome various obstacles, such as attenuation, path loss, and interference, as they propagate through the wireless medium.

The power amplification module 115 must balance the need for amplification with considerations for linearity and efficiency. Linearity is crucial to avoid signal distortions that can degrade the quality of the transmitted data. Efficiency is also an important aspect to optimize power usage and minimize energy consumption.

Additionally, the power amplification module 115 may incorporate techniques such as adaptive power control to adjust the power level based on system requirements and channel conditions. This dynamic power control helps optimize the transmission performance, maintain signal quality, and manage power consumption.

In summary, the power amplification module 115 in an OFDM system is responsible for amplifying the RF signals to a suitable power level for transmission. By boosting the signals, the power amplification module ensures reliable and effective communication, overcoming signal attenuation and interference. The module employs power amplifiers designed for the specific frequency range and power requirements of the system while considering factors such as linearity, efficiency, and adaptive power control.

Figure 4:
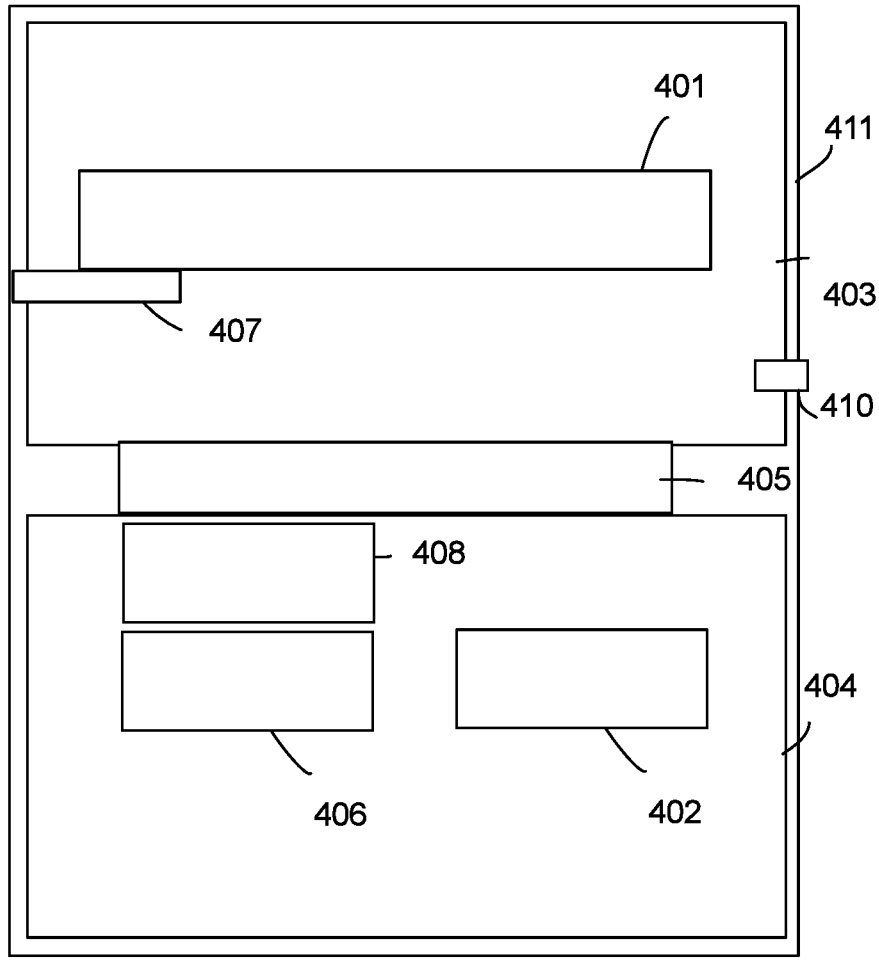
FIG. 4 shows a different aspect of a lighting apparatus example.

In FIG. 4, the OFDM modulation module 402 and the RF upconversion module 406 are placed in a second compartment 404. The second compartment may be made of plastic material so that wireless signal is not shielded by a metal surface.

The light source 401 is placed in a first compartment 403.

There is a heat insulation layer 405 between the first compartment 403 and the second compartment 404. For example, a foam, a plastic material or a bracket to keep a gap between the first compartment 403 and the second compartment 404.

In FIG. 1, the antenna module 117 has multiple antenna areas 118, 119, 120 for transmitting different RF signals 121, 122, 123 to the OFDM network 124 at the same time.

In FIG. 4, a metal heat dissipation unit 407 is used for dissipating heat of the light source 401.

The antenna areas 408 uses the metal heat dissipation unit 407 as a ground, e.g. connecting to the metal heat dissipation unit 407 via a wire, which may help transmit signals while not carrying too much heat to affect the wireless components.

In some embodiments, the lighting apparatus may also include a manual switch 410.

The manual switch 410 is disposed on a light housing 411 for holding the light source 401.

A user operates the manual switch 410 to enable or disable the OFDM modulation module.

There are several types of light devices that utilize LED (Light-Emitting Diode) technology as their light source, including downlights, panel lights, and spotlights. These LED-based light devices offer numerous advantages such as energy efficiency, long lifespan, and versatility in lighting applications. Furthermore, integrating OFDM components can enhance their capabilities in terms of color temperature adjustment and connectivity to other IoT (Internet of Things) devices.

Downlights, which are recessed light fixtures installed in ceilings, are commonly used for general lighting in homes, offices, and retail spaces. With LED technology, downlights provide efficient illumination while consuming less energy. Integrating OFDM components in LED downlights allows for precise control over color temperature, enabling users to adjust the light output to their desired warmth or coolness. This flexibility creates a comfortable and customizable lighting environment.

Panel lights are flat, slim light fixtures used for illuminating large areas such as offices, conference rooms, and schools. LED-based panel lights offer energy efficiency and uniform light distribution. By integrating OFDM components, panel lights can be equipped with wireless connectivity, allowing them to connect to IoT devices and smart lighting systems. This connectivity enables seamless integration with lighting control applications, scheduling, and integration with other IoT devices for automated lighting scenarios.

Spotlights are directional light fixtures used for accent lighting or highlighting specific objects or areas. LED spotlights provide focused illumination and are commonly used in art galleries, retail displays, and architectural lighting. By integrating OFDM components, LED spotlights can incorporate color temperature adjustment features, allowing users to change the color appearance of the light output to match specific moods, themes, or environments. This adaptability enhances their versatility and creative possibilities in various applications.

In addition to color temperature adjustment, integrating OFDM components in LED light devices opens up opportunities for connectivity with other IoT devices. By incorporating wireless communication capabilities, LED downlights, panel lights, and spotlights can seamlessly connect to IoT ecosystems and smart home or building automation systems. This connectivity enables users to control the lights remotely, create lighting schedules, and integrate them with other smart devices for comprehensive lighting management.

In summary, LED-based light devices such as downlights, panel lights, and spotlights offer energy-efficient and versatile lighting solutions. Integrating OFDM components enhances their functionality by enabling precise color temperature adjustment and connectivity to other IoT devices. This integration allows for customizable lighting environments, seamless integration with smart lighting systems, and convenient control options for enhanced comfort, energy management, and automation in various lighting applications.

Figure 5:
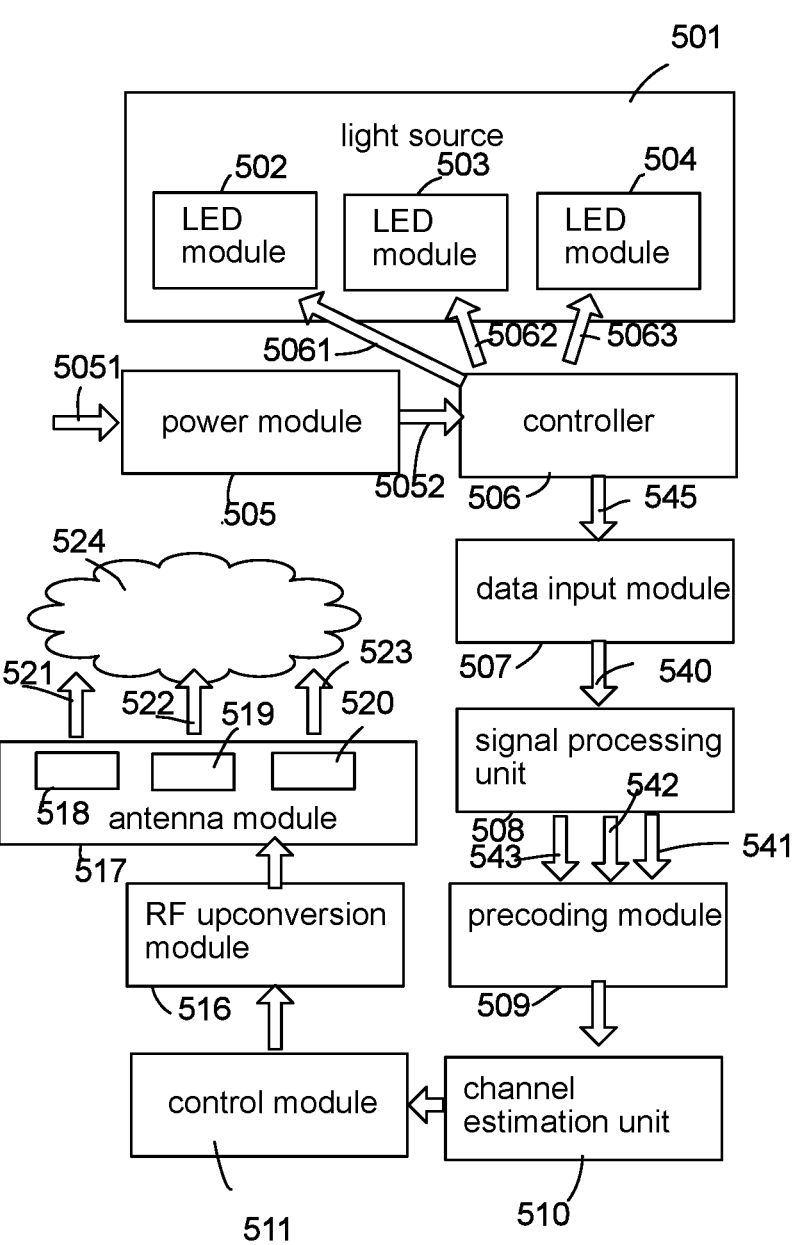
FIG. 5 shows another lighting apparatus embodiment.

Please refer to FIG. 5. FIG. 5 illustrates another lighting apparatus embodiment.

In FIG. 5, a lighting apparatus includes a light source 501, a power module 505, a controller 506, a data input module 507 and a signal processing unit 508.

The light source includes multiple types of LED modules 502, 503, 504.

The power module 505 converts an AC power 5051 to a DC power 5052.

The controller 506 generates multiple driving currents 5061, 5062, 5063 supplied to the LED modules 502, 503, 504.

The data input module 507 is coupled to the controller 506.

The data input module 507 receives input data 545 to be transmitted. The data input module 507 may process the input data 545 or route the input data 545 directly as the input data 540 to be handled by the signal processing unit 508.

The signal processing unit 508 is coupled to the data input module 507 to process the input data 540 into multiple data streams 541, 542, 543 corresponding to the plurality of transmit antennas 518, 519, 520.

Each transmit antenna 518, 519, 520 transmits the corresponding data stream 541, 542, 543 independently.

As mentioned above, in FIG. 2, the input data may be generated by the controller 201 according to transmitted data of an electronic device 202 connected to the controller 201.

In some embodiments, the electronic device 202 is coupled to the controller 201 via a second network 203 with a different protocol from a first network 204 used by the plurality of transmit antennas.

In some embodiments, there are multiple electronic devices 202, 207, 208 wirelessly connected to the signal processing unit to share the plurality of antennas to transmit data of the multiple electronic devices 202, 207, 208.

In some embodiments, the electronic device is coupled with a same housing used for disposing the light source.

The control device adjusts the light source for the electronic device to operate normally.

In some embodiments, the electronic device is a camera device.

Recorded video of the camera device is encoded by the signal processing unit and sent to an external device over the Internet via the plurality of antennas.

In some embodiments, the electronic device communicates with an external device over Internet via the plurality of multiple antennas.

In some embodiments, the signal processing unit and the plurality of antennas shared with the electronic device.

The electronic device disables another signal processing unit of the external device for routing output data of the electronic device to the signal processing unit of the lighting apparatus via the second network.

In some embodiments, the electronic device also has a light source for providing illumination together with the lighting apparatus.

In some embodiments, the second network is an optical modulation network.

Data transmission between the lighting apparatus and the electronic device is modulated over an emitted light of the electronic device.

In some embodiments, the electronic device is a sensor for collecting ambient information aside the lighting apparatus.

The lighting apparatus is fixed to a stationary platform.

In some embodiments, the electronic device sends a connection parameter to the controller via the second network for the controller establishes the first network for operating the plurality of antennas.

In FIG. 5, the lighting apparatus may also include a precoding module 509.

The precoding module 509 applies precoding to the multiple data streams to enhance signal transmission performance.

Precoding is a signal processing technique that aims to enhance the transmission quality and overall system capacity in MIMO systems. By employing precoding, the precoding module modifies the transmitted signals in such a way that they can be optimally received and decoded by the intended receiver.

The purpose of applying precoding to the multiple data streams is to mitigate interference and improve signal quality. Since the multiple data streams are transmitted simultaneously using different antennas, there is a potential for interference between the streams. The precoding module addresses this challenge by manipulating the transmitted signals in a manner that minimizes interference and maximizes the received signal quality at the intended receiver.

By applying precoding, the precoding module optimizes the transmission parameters and adjusts the spatial characteristics of the transmitted signals. This enables better signal reception and decoding at the receiver, resulting in improved signal-to-noise ratio (SNR), increased data rates, and enhanced overall system performance.

The precoding module considers factors such as the channel state information (CSI) obtained from the channel estimation unit and the desired transmission objectives. Based on this information, it applies precoding algorithms that take into account the specific characteristics of the channel and the desired signal properties.

Overall, the role of the precoding module in MIMO transmission is to intelligently manipulate the transmitted signals to improve signal transmission performance. By employing precoding techniques, it optimizes the spatial characteristics of the transmitted signals, mitigates interference, and enhances the overall quality and efficiency of the wireless communication system.

Suppose there are several independent data streams that need to be transmitted simultaneously. Each data stream is associated with a specific transmit antenna. The precoding module receives these data streams and applies precoding techniques to modify the signals before transmission.

The main objective of precoding is to enhance the quality of the transmitted signals and improve overall system performance. By intelligently manipulating the transmitted signals, the precoding module aims to maximize the received signal quality at the intended receiver while minimizing interference and maintaining data integrity.

To achieve this, the precoding module takes into account various factors, including the characteristics of the wireless channel and the desired transmission objectives. It leverages information about the channel conditions, such as signal propagation, fading effects, and interference levels, to make informed decisions.

Based on the channel information, the precoding module applies specific precoding algorithms to optimize the transmitted signals. For instance, it may employ techniques like zero-forcing, minimum mean square error (MMSE), or maximum ratio transmission (MRT) depending on the channel conditions and system requirements.

Zero-forcing precoding aims to nullify or minimize interference between the data streams by applying appropriate signal processing techniques. MMSE precoding further enhances signal quality by considering the noise level and minimizing the mean square error between the transmitted and received signals. MRT takes advantage of favorable channel conditions to maximize signal reception and improve overall system capacity.

By employing the suitable precoding technique, the precoding module ensures that the transmitted signals are optimized for reception at the intended receiver. This leads to improved signal quality, increased data rates, and enhanced overall system performance.

In FIG. 5, the lighting apparatus may also include a channel estimation unit 510.

The channel estimation unit 510 estimates channel characteristics for each transmit antenna based on a receiver feedback information received from a receiver.

The channel estimation unit, denoted as unit 510, plays a crucial role in optimizing signal transmission in a wireless communication system. It focuses on estimating the characteristics of the channel between the transmitter and the receiver. By leveraging feedback information received from the receiver, the channel estimation unit gathers data that helps it understand the wireless channel's behavior.

The channel estimation unit operates by analyzing feedback information provided by the receiver. This information typically includes measurements or observations related to the received signals. By studying these measurements, the channel estimation unit can infer valuable insights about the wireless channel's characteristics, such as signal propagation, fading effects, and interference levels.

Based on the received feedback, the channel estimation unit aims to estimate the channel's properties for each transmit antenna. It analyzes the data to understand how the transmitted signals are affected by the wireless channel during propagation. By accurately estimating the channel characteristics, the unit gains valuable knowledge about the quality and behavior of the transmission path.

This estimation process is crucial because it enables the system to adapt and optimize its transmission parameters based on the channel conditions. By understanding the channel characteristics, the system can adjust parameters like power allocation, modulation schemes, and coding schemes to enhance signal quality and maximize overall system performance.

The channel estimation unit continuously updates its estimations as new feedback information is received from the receiver. This ensures that the system adapts to dynamic changes in the wireless channel, such as variations in interference levels or fading conditions.

By estimating the channel characteristics for each transmit antenna, the channel estimation unit provides valuable information that is utilized by other modules or components of the system. This information helps in making informed decisions about signal processing, precoding, and other transmission strategies to optimize signal reception at the receiver.

The channel estimation unit in a wireless communication system analyzes feedback information received from the receiver to estimate the characteristics of the wireless channel for each transmit antenna. This estimation process enables the system to adapt and optimize its transmission parameters based on the channel conditions, ultimately improving signal quality and system performance.

In FIG. 5, the lighting apparatus may also include a control module 511.

The control module 511 adjusts the precoding based on the estimated channel characteristics.

The control module 511 is used for optimizing signal transmission in a wireless communication system that utilizes multiple transmit antennas and multiple receive antennas. It is responsible for adjusting the precoding scheme based on the estimated channel characteristics. By leveraging the information obtained from the estimation of channel properties, the control module ensures that the precoding parameters are optimized to suit the prevailing conditions of the wireless transmission environment.

Upon receiving the estimated channel characteristics from the channel estimation unit, the control module carefully analyzes this information to gain insights into the behavior of the wireless transmission channel. It considers factors such as signal propagation, variations in signal strength, and potential sources of interference to understand the quality and behavior of the transmission path.

Based on this analysis, the control module dynamically modifies the precoding scheme. Its primary objective is to enhance the performance of the system by adapting the precoding parameters in response to the estimated channel characteristics. By tailoring the precoding process to align with the estimated channel conditions, the control module optimizes the signal transmission to achieve improved signal quality and overall system efficiency.

The adjustment of precoding involves fine-tuning various parameters associated with the precoding scheme. These parameters may include transmission weights, power allocation, or the selection of appropriate spatial multiplexing techniques. The control module optimizes these parameters in real-time, taking into account the dynamic nature of the wireless transmission environment.

For example, if the estimated channel characteristics suggest the presence of significant interference, the control module may adjust the precoding scheme to mitigate the effects of interference on the transmitted signals. Conversely, if the channel conditions indicate favorable signal propagation and low levels of interference, the control module may optimize the precoding to maximize data rates and overall system capacity.

Through continuous monitoring and adaptation, the control module ensures that the precoding scheme remains synchronized with the estimated channel characteristics. By dynamically adjusting the precoding parameters, the control module maintains optimal signal transmission performance in the system, enabling efficient utilization of the wireless transmission resources and improved overall system reliability.

In some embodiments, at least a portion of the multiple transmit antennas are disposed on different planes.

Figure 6:
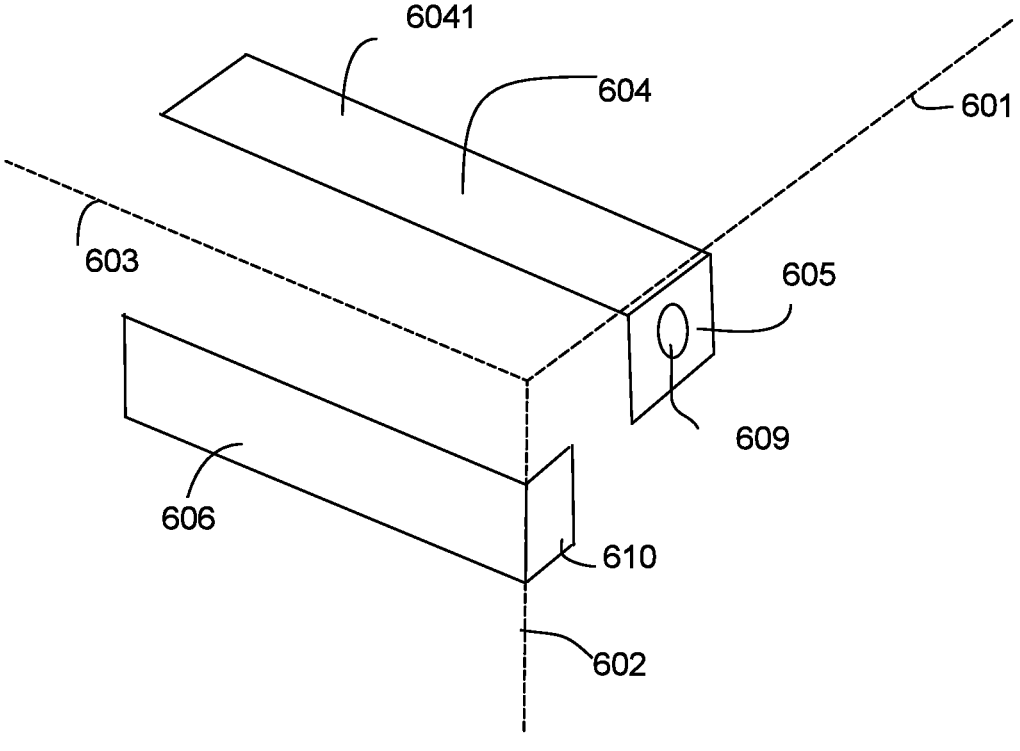
FIG. 6 shows a three-dimension antenna example.

In FIG. 6, two transmit antennas 604, 606 are disposed on different planes. Dashed lines refer to three axis 601, 602, 603. In some embodiments, the two transmit antennas 604, 606 may be attached to exterior surface of interior surface of a housing for holding the light source and other components mentioned above.

In some embodiments, at least of the plurality of the transmit antennas is a three-dimension antenna.

In FIG. 6, the antenna 604 has a first part 6041 and a second part 605. There is a folding angle between the first part 6041 and the second part 605 making the antenna 604 a three-dimension antenna.

Figure 7:
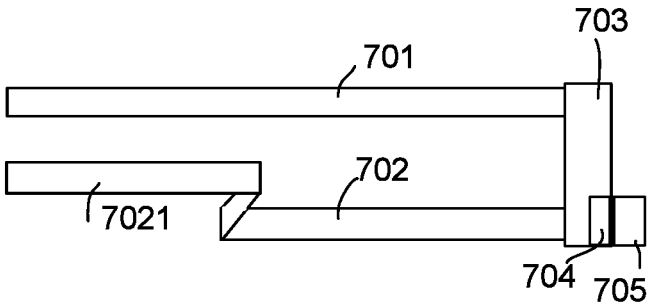
FIG. 7 shows another three-dimension antenna example.

In FIG. 7, the three-dimension antenna includes a metal node 703, a first branch 701 and a second branch 702.

The first branch 701 and the second branch 702 are connected to the metal node 703.

The metal node 703 includes a feeding port 704 for receiving signal to be emitted. The wireless data are transmitted to the feeding node 705 to pass to the feeding port 704 to emit the signal from the antenna.

At least a portion of the first branch and at least a portion of the second branch are arranged on different planes.

For example, FIG. 7 shows the antenna 702 having a portion 7021 of the second branch 702 are arranged on different planes.

In some embodiments, three dimension antenna is a multi-band antenna for transmitting signals in multiple frequency ranges. For example, such band may receive and/or transmit signals of multiple frequency ranges.

In some embodiments, the first branch includes a first plurality of segments.

Each segment of the first plurality of segments is smaller than $\frac{1}{10}$ of a lowest operating free-space wavelength of the multi-band antenna.

In some embodiments, the first plurality of segments includes at least ten segments.

FIG. 8, FIG. 9, FIG. 10 and FIG. 11 illustrate four antennas with different segments.

Figures 8, 9, 10, 11:
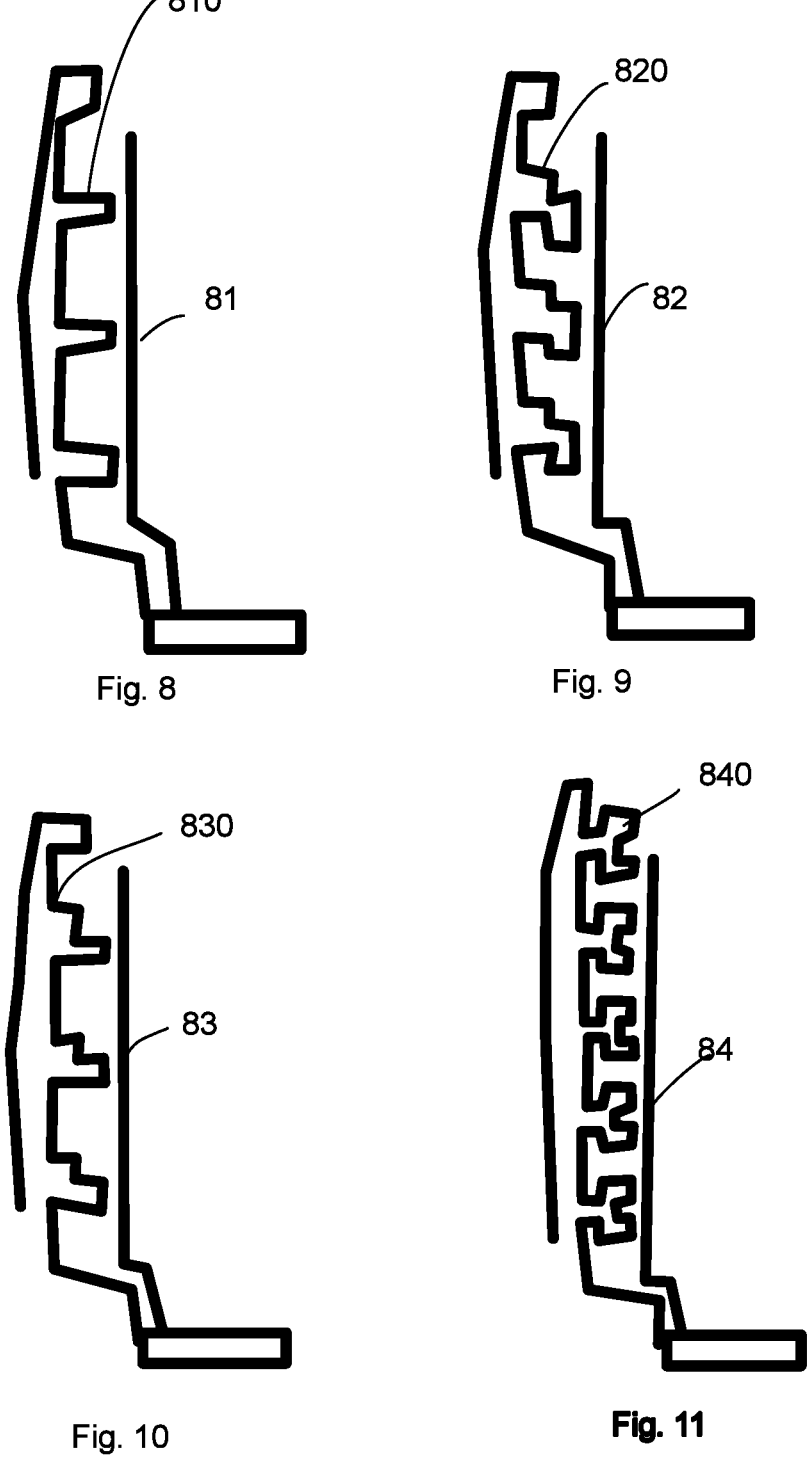
FIG. 8 shows an antenna with multiple segments.
FIG. 9 shows another antenna with different number of segments.
FIG. 10 shows another antenna with different number of segments.
FIG. 11 shows another antenna with different number of segments.

The antennas 81, 82, 83, 84 in FIG. 8, FIG. 9, FIG. 10 and FIG. 11 all have two branches, but have different number of segments. A segment of the antenna mentioned here refers to a portion with bending curve so as to form recursive module that can receive multiple bands of frequency ranges. For example, FIG. 8 show an antenna 81 with four segments 810.

FIG. 9 shows an antenna 82 with four main segments 830 and each segments further has segments.

FIG. 10 shows another antenna 83 with multiple segments 830 arranged in a recursive order.

FIG. 11 shows another antenna 84 with multiple segments 840 with more segments than FIG. 10.

These antennas may be disposed on the light housing that hold the light source and other components. Non-metal shield may be used to protect the antenna while keeping signal not being interfered.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
a light source comprising multiple types of LED modules;
a power module for converting an AC power to a DC power;
a controller for generating multiple driving currents supplied to the LED modules;
a data input module coupled to the controller, wherein the data input module receives input data to be transmitted;
a plurality of transmit antennas; and
a signal processing unit coupled to the data input module to process the input data into multiple data streams corresponding to the plurality of transmit antennas, wherein each transmit antenna transmits the corresponding data stream independently, wherein at least of the plurality of the transmit antennas is a three-dimension antenna, wherein the three-dimension antenna comprises a metal node, a first branch and a second branch, wherein the first branch and the second branch are connected to the metal node, wherein the metal node includes a feeding port for receiving signal to be emitted, wherein at least a portion of the first branch and at least a portion of the second branch are arranged on different planes.

2. The lighting apparatus of claim 1, wherein the input data are generated by the controller according to transmitted data of an electronic device connected to the controller.

3. The lighting apparatus of claim 2, wherein the electronic device is coupled to the controller via a second network with a different protocol from a first network used by the plurality of antennas.

4. The lighting apparatus of claim 3, wherein there are multiple electronic devices wirelessly connected to the signal processing unit to share the plurality of antennas to transmit data of the multiple electronic devices.

5. The lighting apparatus of claim 3, wherein the electronic device is coupled with a same housing used for disposing the light source, wherein the controller adjusts the light source for the electronic device to operate normally.

6. The lighting apparatus of claim 5, wherein the electronic device is a camera device, wherein recorded video of the camera device is encoded by the signal processing unit and sent to an external device over the Internet via the plurality of antennas.

7. The lighting apparatus of claim 3, wherein the electronic device communicates with an external device over Internet via the plurality of multiple antennas.

8. The lighting apparatus of claim 3, wherein the signal processing unit and the plurality of antennas shared with the electronic device, wherein the electronic device disables another signal processing unit of the external device for routing output data of the electronic device to the signal processing unit of the lighting apparatus via the second network.

9. The lighting apparatus of claim 8, wherein the electronic device also has a light source for providing illumination together with the lighting apparatus.

10. The lighting apparatus of claim 9, wherein the second network is an optical modulation network, wherein data transmission between the lighting apparatus and the electronic device is modulated over an emitted light of the electronic device.

11. The lighting apparatus of claim 3, wherein the electronic device sends a connection parameter to the controller via the second network for the controller establishes the first network for operating the plurality of antennas.

12. The lighting apparatus of claim 2, wherein the electronic device is a sensor for collecting ambient information aside the lighting apparatus, wherein the lighting apparatus is fixed to a stationary platform.

13. The lighting apparatus of claim 1, further comprising a precoding module, wherein the precoding module applies precoding to the multiple data streams to enhance signal transmission performance.

14. The lighting apparatus of claim 13, further comprising a channel estimation unit, wherein the channel estimation unit estimates channel characteristics for each transmit antenna based on a receiver feedback information received from a receiver.

15. The lighting apparatus of claim 14, further comprising a control module, wherein the control module adjusts the precoding based on the estimated channel characteristics.

16. The lighting apparatus of claim 1, wherein at least a portion of the multiple transmit antennas are disposed on different planes.

17. The lighting apparatus of claim 1, wherein three dimension antenna is a multi-band antenna for transmitting signals in multiple frequency ranges.

18. The lighting apparatus of claim 17, wherein the first branch comprises a first plurality of segments, wherein each segment of the first plurality of segments is smaller than $\frac{1}{10}$ of a lowest operating free-space wavelength of the multi-band antenna.

19. The lighting apparatus of claim 18, wherein the first plurality of segments comprises at least ten segments.

* * * * *